United States Patent [19]

Claxton

[11] 4,198,801
[45] Apr. 22, 1980

[54] HARVESTING OF TRELLIS-SUPPORTED GRAPEVINES

[75] Inventor: Gerald L. Claxton, Fresno, Calif.

[73] Assignee: Up-Right, Inc., Berkeley, Calif.

[21] Appl. No.: 878,925

[22] Filed: Feb. 17, 1978

[51] Int. Cl.³ .................................. A01D 91/04
[52] U.S. Cl. .............................................. 56/1
[58] Field of Search ............ 56/1, 330, 328 R, 327 R, 56/328 TS, DIG. 2

[56] References Cited

U.S. PATENT DOCUMENTS

3,229,453   1/1966   Harrett ........................... 56/330

Primary Examiner—Russell R. Kinsey
Attorney, Agent, or Firm—Phillips, Moore, Weissenberger, Lempio & Majestic

[57] ABSTRACT

The harvesting of grapes from vines grown on a horizontal trellis-supported wire wherein the wire and fruit-bearing portions of the vine which are secured to the wire are directly held and uniformly shaken along the length of the wire with no shaking energy being directly imparted to the vine trunks or to the foliage canopy over the fruit-bearing portions of the vines and with minimal disturbance of the canopy.

10 Claims, 12 Drawing Figures

FIG_1

FIG_2

FIG_3

FIG_4

FIG_5

FIG_6

FIG_7

FIG_9

FIG_10  FIG_11

HARVESTING OF TRELLIS-SUPPORTED GRAPEVINES

BACKGROUND OF THE INVENTION

The present invention relates to the mechanical harvesting of grapes from vines trained on a vertical trellis system.

A typical vineyard has a great number of spaced-apart vines planted in parallel rows. Some vineyards use a seven-foot spacing between vines, others use an eight-foot spacing. A typical vertical trellis system, a portion of hich is illustrated in FIG. 1, includes a vertical, wood or metal grape stake post 11 at each vine 12 throughout the vineyard, and a fruiting wire 13 attached to each post in a row, the fruiting wire being at a constant height above the ground (generally somewhere between about forty-two to forty-eight inches above the ground, depending on the vineyard), the wire being tensioned along the row to provide a support for the fruit-bearing portions of the vine, which support is substantially horizontal and continuous for the full length of the row.

Two common systems of vine training are used, a bilateral cordon system and a cane-pruned system.

Figures 1, 2:
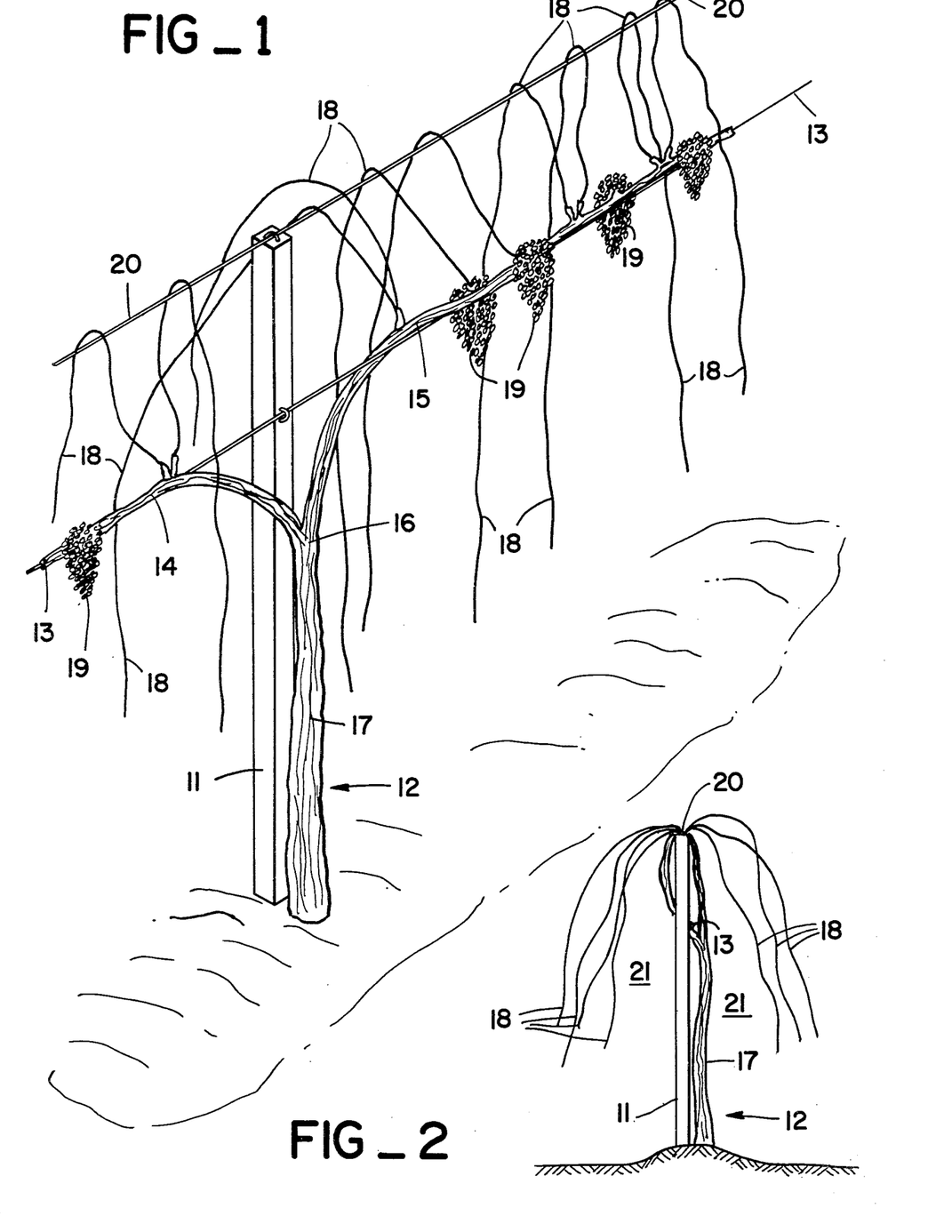
FIG. 1 is a perspective view of a bilateral cordon trained grapevine system.
FIG. 2 is an elevational view of the bilateral cordon system of FIG. 1, looking down the row.

In the bilateral cordon system of FIG. 1, two cordons 14 and 15, branching out from the upper end 16 of the vine trunk 17 and extending in opposite directions, are securely attached to the fruiting wire by permanent plastic ties or heavy twine. The cordons are grown along the fruiting wire so that the cordons of adjacent vines will meet. The upper ends 16 of the vine trunks will be usually anywhere from six to ten inches below the fruiting wire. The cordons are permanent wood and are not pruned back at pruning time. The laterals 18 which had grown during the growing season are pruned back to spurs at pruning time. During the growing season the bunches of grapes 19 will grow from the cordons and be closely adjacent thereto so that a relatively compact fruiting zone is formed along the horizontally supported cordons. Typically the grapes will grow in a zone extending about eight inches above and below the fruiting wire, with most of the grapes being fairly close to the level of the wire.

The trellis system also includes a foliage-supporting wire 20 positioned at the top of the posts 11 parallel to and above the fruiting wire 13. Typically the foliage wire 20 will be located about twelve to fourteen inches above the fruiting wire. During the growing season, as new laterals 18 grow from the cordons, they will first grow upwardly and attach themselves to the upper foliage wire. As they continue to grow they eventually reach a length when they are no longer strong enough to hold themselves upright. When the laterals are four to six feet long, they will droop over and form a canopy of foliage draping out away from and over the fruiting wire. When the fruit is maturing it is generally completely shaded and protected from the sun and damaging heat by the heavy foliage canopy which is hanging over it much like an umbrella. In a fully mature vine, the relatively strong laterals 18 form an open area 21 (FIG. 2) underneath the canopy and around the fruiting zone, much like the open area under a weeping willow tree.

Figure 3:
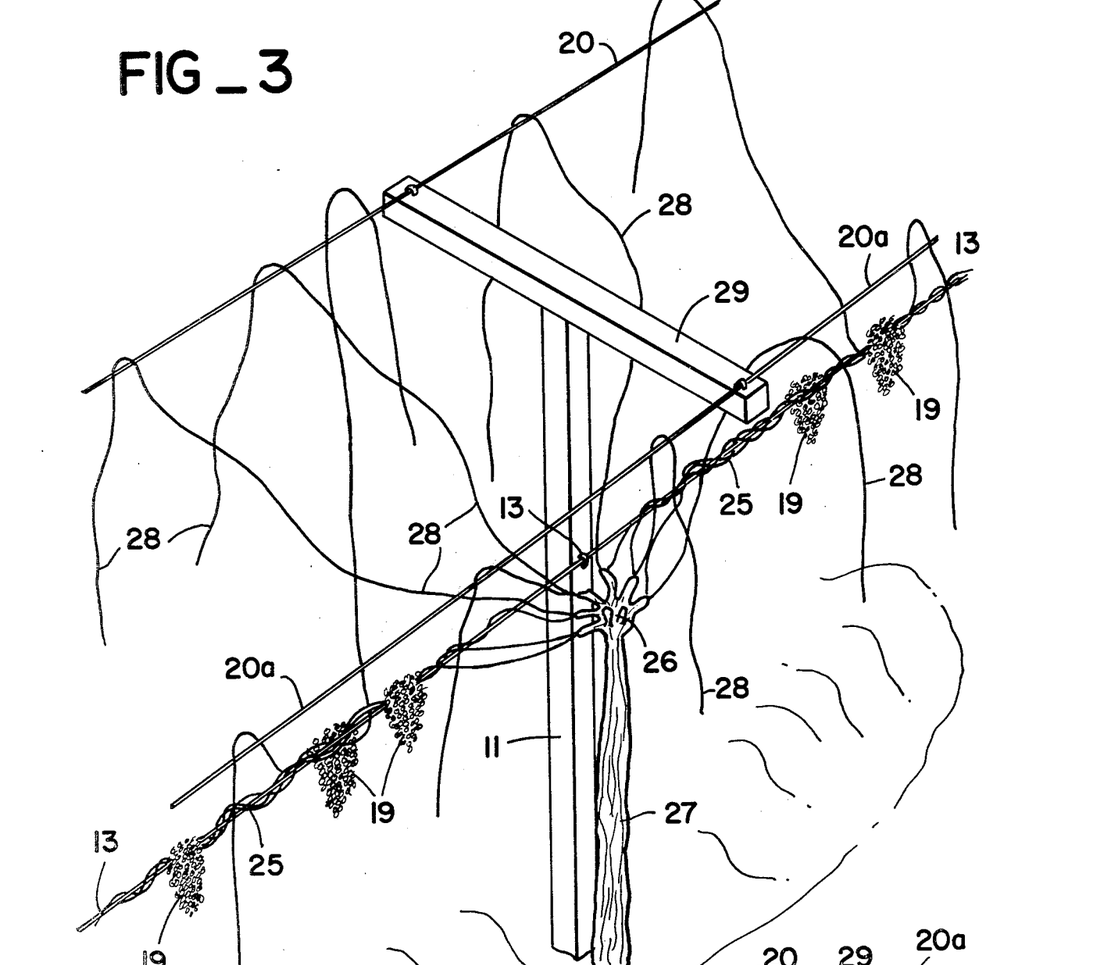
FIG. 3 is a perspective view of a cane-pruned grapevine system.

In a cane-pruned system, illustrated in FIG. 3, the vine is pruned back each year to four to five of the one-year canes 25 (ie., those of the previous growing season) growing from the head 26 of the vine trunk 27. These one-year canes are then extended along the fruiting wire 13 and are secured thereto by semi-permanent twist ties.

Figure 4:
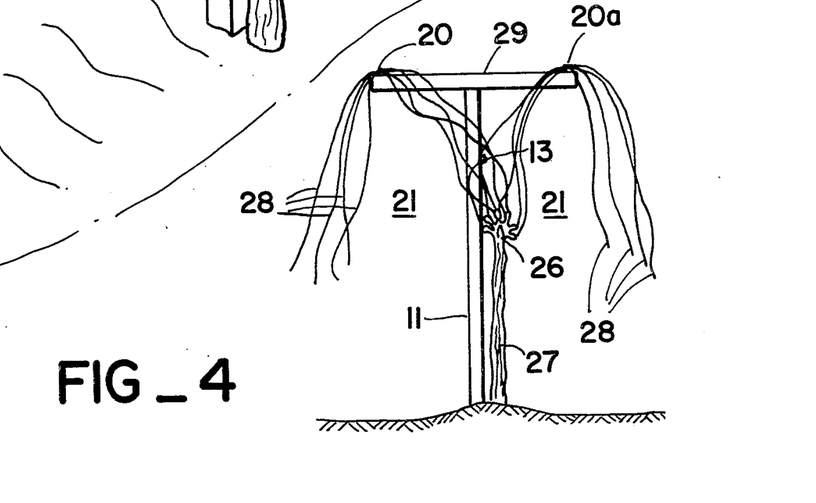
FIG. 4 is an elevational view of the cane-pruned system of FIG. 3 looking down the row.

Again, during the growing season the bunches of grapes 19 will grow from the one-year canes 25 and be borne in a compact fruiting zone closely adjacent the horizontally supported canes. Also, as before, new canes 28 will grow from vine head 26 and canes 25 to form a canopy over the fruiting zone. FIG. 3 also illustrates a commonly used trellis system wherein a crossarm 29 is secured to the top of each post 11 to support two foliage wires 20 and 20a. The crossarms and two foliage wires serve to widen out the canopy since the vine laterals 28 are supported further away from the center of the vine in a direction transverse to the centerline of the row. The open area 21 under the canopy (FIG. 4) is, of course, correspondingly widened.

A cordon-trained vine can also be trained on the T-trellis system of FIG. 3, and a cane-pruned vine can also be trained on the single foliage wire trellis system of FIG. 1 if desired.

The most widely used method for the harvesting of grapes from the vine and trellis system of FIGS. 1–4 utilize opposed horizontal striker rods on each side of the row which are pivoted about vertical axes located on either side of the vine canopy. The rods are oscillated about these axes so that they penetrate the vine canopies and strike against the fruit to remove it.

Although this method has proven effective in the removal of grapes from the vines, it does have a disadvantage in that oftentimes damage is done to the vine and fruit during the harvesting process.

In addition to providing shade to the grapes, the leaves of the vine canopy act as small nutrient factories, taking the light from the sun and converting it to nutrients to supply the vine with energy to grow the crop. During the course of the growing season, almost all of the nutrients supplied by the leaves are used to produce the heavy crop of grapes on the vine. After harvest, the leaves are still essential to supply nutrients for the building up of carbohydrates in the vine to help produce the next year's crop. It has been found that if all of the canopy leaves are removed at harvest time for several successive years, the strength of the vine is reduced to a point wherein there is a substantial crop reduction.

Although the pivotal striker system has been developed so that it does not remove all of the leaves at harvest time, it does beat off enough of the leaves so that there is considerable concern in the vineyard industry of a possible crop reduction in the future. In some cases, crop reductions have actually been experienced.

An additional disadvantage of the pivot striker system is that the leaves which are beaten off the vines are often shattered into small particles which when mixed with the harvested fruit are very difficult to remove. These small particles travel with the fruit to the winery and when the fruit is crushed they are fermented with the crushed fruit into wine. The fermented leaf particles form an aldehyde during fermentation which imparts a bitter and objectionable taste to the wine.

Another disadvantage of this harvesting system is that the beating of the striker rods often causes damage to the cambium layer of the vine canes and in some cases breaks the spurs from the cordons. This vine damage reduces the effectiveness of those canes in carrying nutrients to the fruit. It can also cause a rotting at the point of damage and in some cases will cause the canes to actually die.

In an effort to reduce the vine damage and leaf-removal problems of the pivotal striker method, attempts have been made to harvest grapes by gripping the trunk of the vine at the upper end thereof and by then shaking the trunk back and forth transversely of the row. The violent shaking of the trunk transfers an energy up through the trunk of the vine and down the cordon or canes when the grapes are attached so that the grapes will be shaken off.

Although the trunk-shaker method does eliminate the leaf-removal, it has not proven to be a very efficient method of removing the fruit. Also, even though the particular vine damages caused by the pivotal striker system are avoided, different forms of damage to the vine and trellis system are done by the trunk-shaker method.

One disadvantage of this method is that not all vines are strong enough or stiff enough to transmit the necessary energy from the trunk to where the fruit is positioned. In a cordon-pruned vine where the cordons are young and flexible, or in a cane-pruned vine wherein the fruit is borne by one-year canes, the fruit is not removed out at the ends of the cordons or canes because the shaking energy is simply not transmitted that far with enough force to remove the fruit.

Even with more mature cordons, the trunk-shaking method does not work effectively with hard-to-pick varieties of grapes. Generally, on a hard-to-pick variety, fruit is removed fairly effectively up to approximately two feet from the head of the vine or post. Beyond that distance, there is poor removal of fruit.

In addition to having a relatively low harvesting efficiency, the trunk-shaking method does cause damage. Sometimes the energy imparted to the trunk of a cordon-trained vine will actually split the trunk vertically down from the point where the cordons branch off all the way to the ground, killing the vine. Also, since the energy applied at the trunk must be applied with enough amplitude to shake the fruit from the vine, such applied energy has in many instances been strong enough to break trellis stakes right at the ground.

It is the principal object of the present invention to provide a harvesting method which has a high efficiency of fruit-removal, which minimizes leaf-removal from the vine canopy and which minimizes vine and trellis damage.

SUMMARY OF THE INVENTION

The primry object of the invention is achieved by positioning shaker elements within the open space under the vine canopy, at a level above the upper end of the vine trunks and on each side of the fruiting zone of the plants so that the fruit-support structure (i.e., the fruiting wire of the trellis system and the cordons or canes secured thereto) is confined between the shaker elements. The shaker elements are then rapidly moved back and forth transversely of the row to shake the fruit support structure with a force sufficient to dislodge the fruit therefrom. At the same time, the reciprocating shaker elements are moved down the row so that the fruit support structure is subjected to substantially the same degree of shaking throughout the full length of the fruiting zone.

Since the fruit-removal energy is applied only to the fruit support structure there will be very little disturbance of the leaf canopy and very little leaf-removal therefrom. Likewise there will be a minimum of damage-creating energy transmitted from the fruit support structure to the vine trunks or trellis posts.

BRIEF DESCRIPTION OF THE DRAWINGS

In the drawings, forming a part of the application and in which like parts are designated by like reference numerals throughout the same.

DESCRIPTION OF THE PREFERRED EMBODIMENTS

Referring now to the drawings, FIGS. 5-8 disclose one form of mechanical harvester constructed in accordance with the invention.

Figure 5:
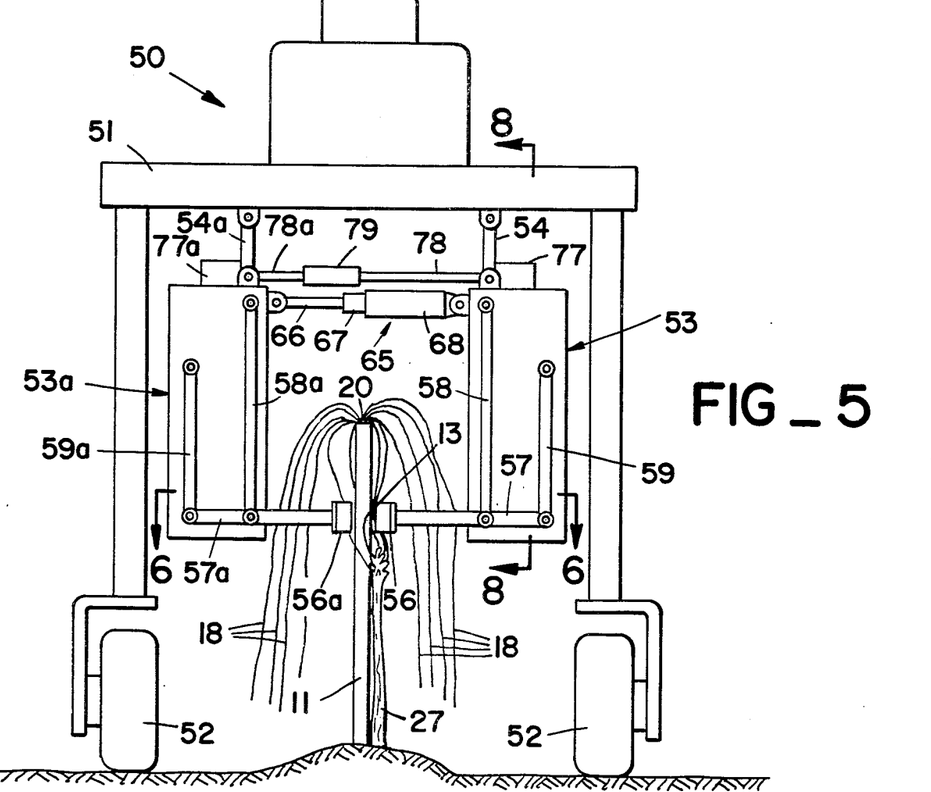
FIG. 5 is an elevational and simplified end view of a harvesting machine constructed in accordance with the present invention.

The harvester 50 comprises a generally inverted-U-shaped frame 51 having wheels 52 at the four corners thereof, the harvester being adapted to straddle and move along a row of grapevines.

A sub-frame 53 is suspended from one side of the main frame 51 by links 54 so that the sub-frame 53 may move transversely to the longitudinal centerline of the harvester. A mirror-image sub-frame 53a is similarly suspended from the main frame by links 54a on the other side thereof. Since the sub-frames 53 and 53a are mirror images of each other, only sub-frame 53 and the elements thereof, or associated therewith, will be described below in detail. Various elements of, or associated with, sub-frame 53a are identified in the drawings by reference numerals having the letter "a" appended thereto. It is to be understood that any description of an element of sub-frame 53 which has a particular reference number (e.g. link 54) will apply equally with regard to the element of sub-frame 53a which has the same reference numeral with the letter "a" appended thereto (e.g. link 54a).

A shaker element, in the form of an elongated horizontal rail 56 having outwardly curved ends is mounted on the inner ends of a pair of horizontal support members 57, each support member extending transversely of the harvester and being suspended from sub-frame 53 by a pair of links 58 and 59 which are pivotally connected to the support members and sub-frame. The link 58, which is closer to the longitudinal centerline of the harvester is longer than the link 59 so that as the support members 57 swing back and forth transversely to the centerline the rail 56 will remain at a substantially constant height above the ground.

Figures 6, 7:
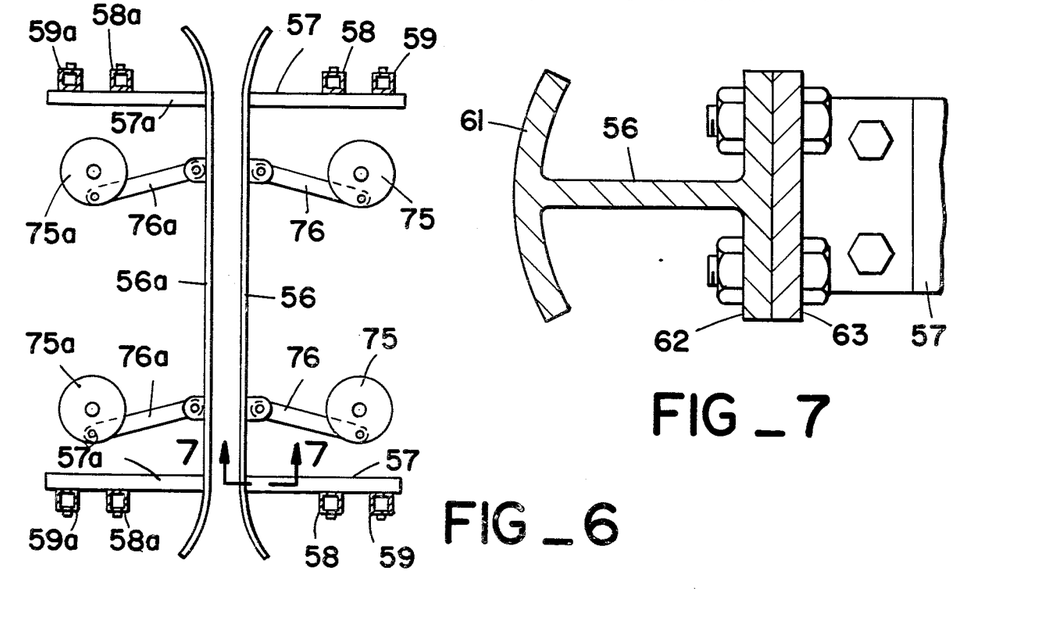
FIG. 6 is a sectional view of the shaker elements of the machine of FIG. 5, taken on line 6—6 thereof.
FIG. 7 is an enlarged sectional view, taken on line 7—7 of FIG. 6, illustrating the shape of the shaker element.

FIG. 7 is an enlarged sectional view, taken on line 7—7 of FIG. 7, to show details of the shaker rail 56 and the mounting thereof to support member 57 which are not easily illustrated in the small scale of FIG. 6. As seen in FIG. 7, the shaker rail 56 has a curved head 61 and a flange 62 spaced therefrom, flange 62 being bolted to bracket 63 which is in turn fixed to the support member 57. Rail 56 is preferably made of aluminum.

A hydraulic cylinder 65 interconnects the sub-frames 53 and 53a, the rod 66 of the cylinder having an adjustable stop member 67 mounted and fixed thereon which engages cylinder housing 68 when pressure is applied to the rod end of the cylinder to limit the amount of retraction of rod 66 and thereby set the minimum horizontal spacing between the rails 56 and 56a. If the thickness of the vine engaged by the rails exceeds this minimum setting the rails will spread apart when the outward force exerted thereon is sufficient to overcome the hydraulic force in the cylinder.

Figure 8:
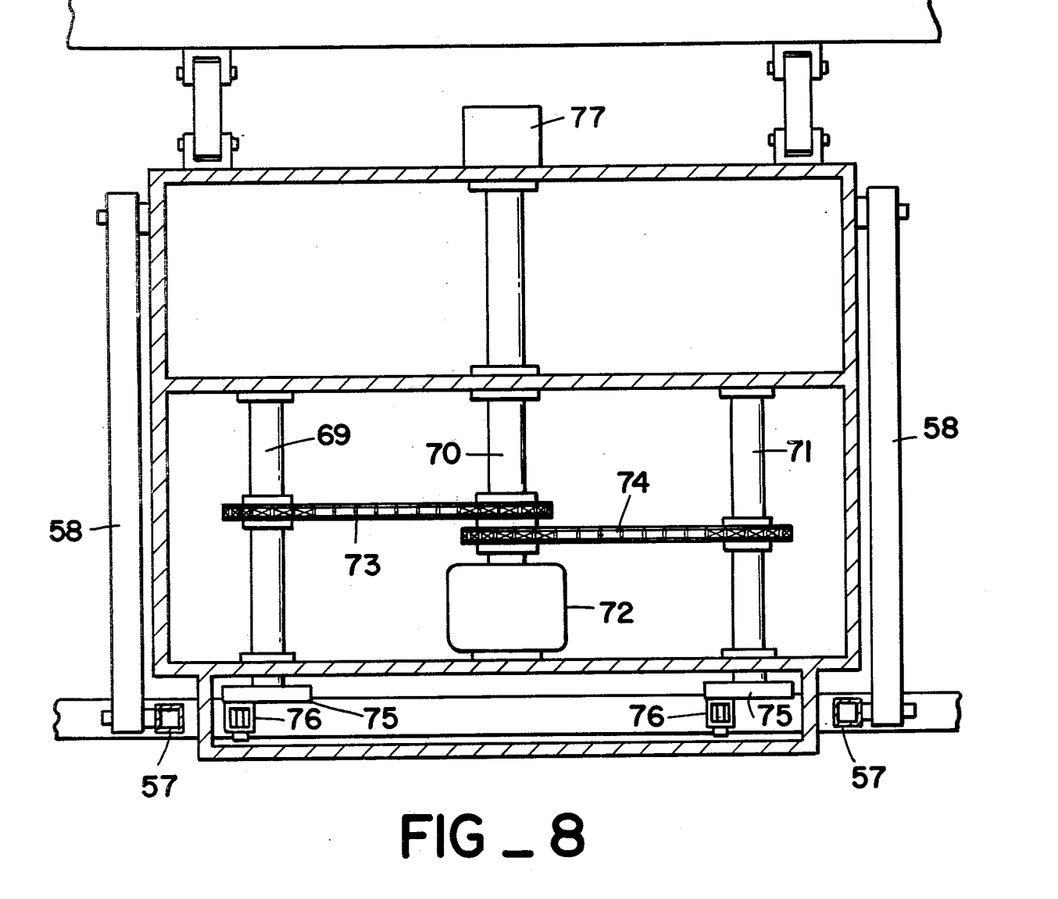
FIG. 8 is a sectional view of the machine of FIG. 5, taken on line 8—8 thereof, illustrating the drive mechanism for the shaker elements on one side of the machine.

The shaker elements 56 and 56a are reciprocated in a manner as shown in FIGS. 6 and 8. Sub-frame 53 has three vertical shafts 69, 70, and 71 journaled therein, main shaft 70 being driven by hydraulic motor 72, such drive being transmitted by chains 73 and 74 to shafts 69 and 71, respectively, to rotate the flywheels 75 fixed to the lower ends of shafts 69 and 71. Drive links 76, each having one end pivotally connected to rail 56 and the other end eccentrically connected to one of the flywheels, convert the rotary motion of the flywheels to reciprocal movement of rail 56 transverse to the longitudinal centerline of the harvester 50.

The rotation of main shaft 70 is transmitted through the right-angle drive unit 77 to shaft 78, telescopic drive connection 79, shaft 78a and right-angle drive unit 77a to the hydraulic motor driven main shaft of sub-frame 53a so that the transverse motion of rails 56 and 56a is synchronized, with rail 56 being moved towards the longitudinal centerline of the machine while rail 56a is moved away therefrom, and vice versa.

In operation, the height of the harvester frame relative to the wheels is adjusted (by conventional means not shown) so that the shaker rails 56 and 56a are positioned above the upper ends of the vine trunks and at the level of the fruiting wire 13. Preferably the shaker rails should be positioned so that the upper edges thereof are slightly above the level of the fruiting wire to minimize damage to the spurs and laterals growing outwardly from the cordons or canes. For example, with a rail having a height of about four inches, the upper edge thereof should preferably be about one-half or three-quarters of an inch above the level of the fruiting wire.

The minimum spacing between the rails 56 and 56a is set at approximately the average width of the posts and vines thereat at the level of the fruiting wire. Depending on whether a cordon-trained or cane-pruned vine system is involved and depending on the age of the vines, spacing may be in the order of three to four inches.

With the level and spacing of the shaker rails set, the harvester is driven onto the end of the row so that the shaker rails enter into the open spaces under the vine canopy and are positioned on each side of the fruiting wire.

The harvester is then driven down the row, with the shaker rails being reciprocated transversely during such movement. Tests have shown that a four- to six-inch (typically five-inch) amplitude of shaker movement at a rate of from three hundred to four hundred cycles per minute is sufficient to remove the fruit if the fruit-support structure is vibrated for approximately one to two seconds. The amplitude and rate for most effective removal will depend on the variety of grapes and age of the vine.

As the harvester moves down the row the shaker elements will continually and closely confine the fruit-support structure therebetween as the fruit-support structure is shaken. The degree of confinement will, of course, vary somewhat along the row due to the fact that the minimum spacing between the rails is set to provide easy clearance of the posts. Thus, at the post area the fruit-support structure will be firmly gripped by the rails. At points between the posts, wherein the width of the fruit support structure is less, the fruit-support structure will be somewhat more loosely confined.

However, even at locations where only loosely confined, the shaker elements still serve to shake, rather than strike against the fruit-support structure. For example, if the shaker rails 56 and 56a are moving to the left (FIG. 6), rail 56 will be pushing the fruit-support structure to the left. After the rails have finished their leftward movement and start to move back to the right, the resilience of the fruit-support structure will cause it to follow the receding rail 56. At some point the rightwardly moving fruit-support structure will lose primary contact with rail 56 and be primarily engaged by rightwardly moving rail 56a which then pushes it the rest of the way to the right. Since engagement of rail 56a and the fruit-support structure occurs when both are moving in the same direction and at generally the same speed the engagement has very little striking impact.

Even if the inertia of the fruit-support structure is such that it will not immediately follow rail 56 back to the right after leftward movement, there will be but a very slight striking impact on the fruit-support by rail 56a as the latter starts to move rightwardly because of the fact that the rotary motion of flywheels 75a is converted to reciprocal motion of rail 56a. Rail 56a will have its greatest transverse speed when at the centerline of the row and the least transverse speed when it is changing direction of movement. Accordingly, if the fruit-support structure should remain at its furthest point of leftward movement, after being brought there by rail 56, rail 56a would then engage it at a low transverse speed, thereby preventing the damage that a sharp impact might cause.

The length of the shaker rails does not appear to be too critical, and rails of a length of from 4 to 9 feet have been tested successfully. A consideration as to length is the catching area of the harvester, i.e., the usual under-vine closure (not illustrated) which catches the falling fruit and directs it to the harvester conveyors. During travel of the harvester down the row some fruit will fall somewhat ahead of the rails while some falls behind, the actual fall depending somewhat on the variety and age of the vine and also on the ground speed of the harvester. The faster the ground speed the farther back the fall area moves. Typically, the ground speed varies from 1 to 4 mph.

The forward ends of the rails are curved outwardly to help guide the vines between the rails and decrease snagging. For harvesters that are intended to move in either direction, the rear ends of the rails are also curved outwardly for the same reason. If the harvester is intended to travel only forwardly, it may be preferable to provide straight rear ends for the rails since there is then a lesser tendency to have fruit fall behind the mechanism.

As is apparent, the fruit-support structure captured between the shaking elements is continuously confined by such elements and transverse shaking energy is applied continuously and directly to the fruit-support structure throughout a very narrow vertical zone, and such shaking energy is applied uniformly along the length of the row as the machine moves therealong. Since the fruit-bearing shoots grow directly from the cordons or canes secured to the fruiting wire 13, even the fruit which is only close to the shaker rails will be shaken off without expending useless energy on the non-fruiting areas of the vine. The ends of the fruit-bearing cordons or canes are shaken with as much force as the portions near the vine trunks. Since the shaking energy is applied directly to the cordon or canes along the length thereof, rather than being transmitted through the fruit-bearing vine structure to the ends thereof as in the trunk-shaking method, less energy needs to be imparted and less damage to the vine structure results as compared to the trunk-shaking method. Energy will, of course, be imparted back to the vine trunks in the present method in a magnitude dependent upon the stiffness of the vine structure between th fruiting wire and vine trunks, but the shaking of the trunks will be very greatly reduced as compared to the trunk-shaking method so that virtually all trunk damage is eliminated.

Much of the fruit will be shaken off forwardly of the shaker rails. Some fruit will be directly engaged, and damaged by contact with the reciprocating shaker rails, but that fruit which is damaged is suitable for wine purposes.

As the harvester moves along the wire, the flexible down-hanging portions of the laterals 18 of the canopy will be engaged and lifted up by the forwardmost shaker rail support members 57. The lifted-up portions will then be guided freely between the sub-frames 53 and 53a and over the shaker rail support members 57 and drive links 76 and will then drop back down after the harvester has moved therepast. Such movement provides very little disturbance to th canopy structure and results in a minimal leaf-removal threfrom. If desired, a suitable sheeting can be provided to overlay the shaker rail support and drive mechanism and cover the inner faces of the sub-frames 53 and 53a to minimize snagging of the canopy canes and further decrease canopy damage and leaf-removal therefrom.

Figure 9:
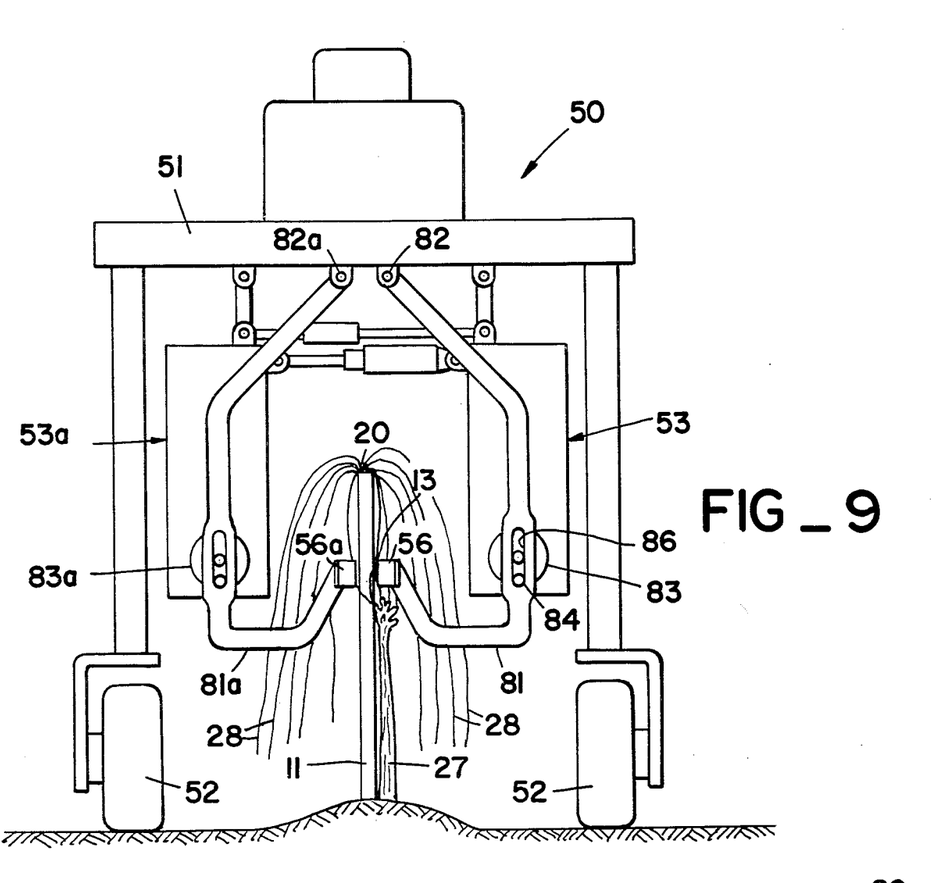
FIG. 9 is a view similar to FIG. 5, illustrating a modification of the mounting and drive mechanism for the shaker elements.

FIG. 9 illustrates a modification of a harvester which can carry out the present method. This modification differs in that the rail 56 is mounted on J-shaped support members 81, one at each end of the rail, which support members are pivotally connected at their upper ends, as at 82, to the harvester frame 51. Reciprocal and transverse movement of rail 56 is provided by flywheel 83 having an eccentric pin 84 thereon which is received within slot 86 of the support member 81. Suitable mechanism (not shown) is provided in sub-frame 53 to drive flywheel 83 so that it rotates about a horizontal axis.

The modification of FIG. 9 is used to harvest fruit in the same manner as previously described. This modification is advantageous in that the support structure for and adjacent to the shaker rails is closer to the ground and thus the amount of canopy disturbance is reduced as the harvester travels down the row.

Since the vertical distance between the pivot 82 and rail 56 is relatively great, the elevation of rail 56 will not change appreciably as it swings back and forth and little vertical abrasion of the vine structure will result.

Figures 10, 11:
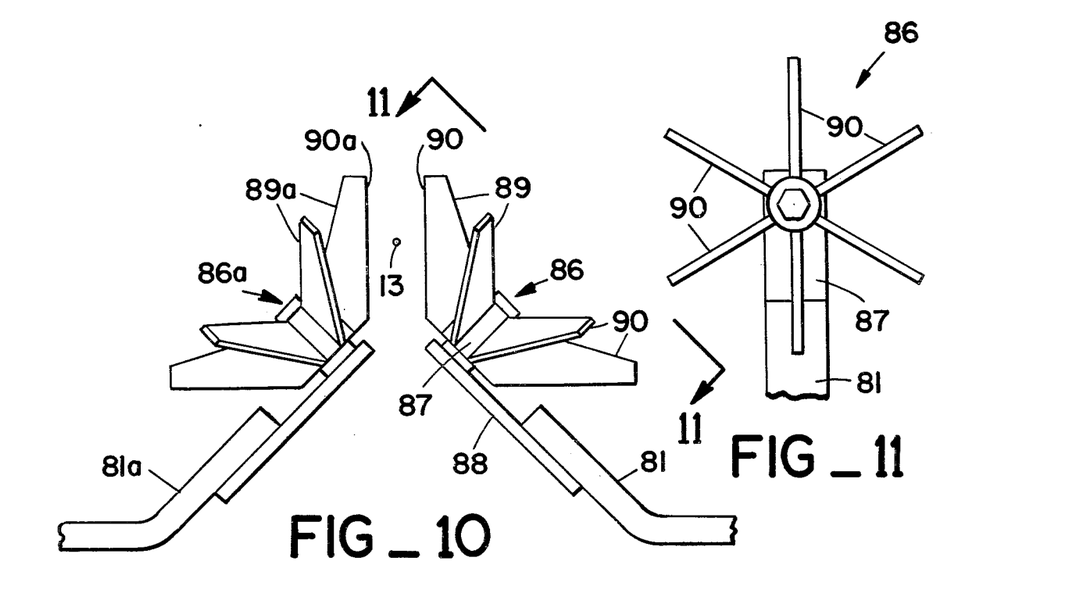
FIG. 10 is an elevational view of a star-wheel modification of the shaker elements.
FIG. 11 is a view of one of the star-wheel shaker elements of FIG. 10 as seen from the line 11—11 thereof.

FIGS. 10 and 11 illustrate a modification of the shaker elements of the harvester. In place of the rails 56 and 56a previously described, a set of opposed spoked star wheel units 86 and 86a are mounted, one on each end of one of the opposed shaker support members 81 and 81a. Star wheel unit 86 comprises a wheel 87 mounted on bracket 88 for free rotation about an inclined axis. Wheel 87 has a plurality of spokes 89 extending outwardly from the axis thereof, each spoke being movable sequentially to a vertical position upon rotation of the wheel about its axis so that the face 90 thereof will be vertically disposed and facing towards the fruiting wire 13. Bracket 88 is suitably fixed to the end of support member 81. Star wheel unit 86a is the same and corresponding parts are designated by like reference numerals with an "a" appended thereto, i.e., 81a, 89a and 90a.

The height of the harvester is adjusted so that midpoints of the uppermost spokes of the wheels are at the level of the fruiting wire 13. When so disposed, the fruit-support structure will be captured between opposed spokes and vigorously shaken by the star wheels as they are reciprocated in unison during movement of the harvester down the row. The overall size of the star wheel units is such that no part thereof contacts the vine trunks during reciprocation in order to prevent a direct shaking of such trunks.

Since the wheels are free to rotate, engagement of a spoke with the vine will cause the wheel to rotate as the harvester moves along the row so that the next spoke will come into engagement with the vine. As a consequence, the spokes of the star wheels will be positioned sequentially at spaced apart points along the length of the row, with a spoke at each point being maintained thereat and without substantial shift thereof aong the vine while the next spoke is positioning itself at the next point along the vine.

Since there is little relative movement along the vine between a spoke and the vine gripped thereby, damage to the spurs and laterals growing from the cordons or canes attached to the fruiting wire 13 is minimized.

Although only one set of opposed star wheels is shown, another set is also preferably used, such other set being located at the other ends of sub-frames 53 and 53a.

Figure 12:
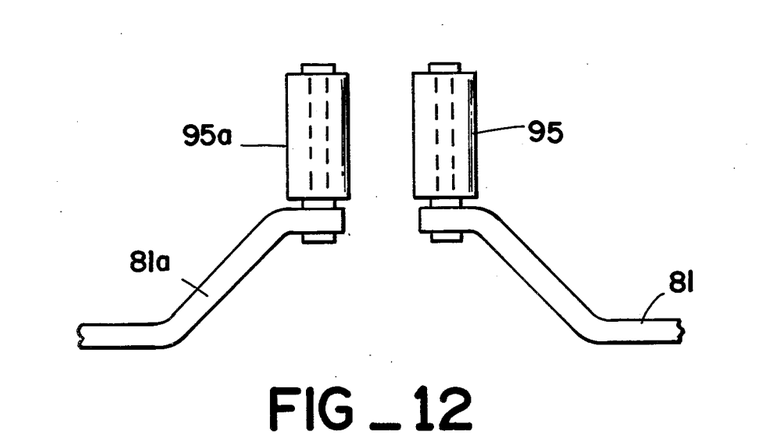
FIG. 12 is an elevational view of a roller modification of the shaker elements.

FIG. 12 illustrates yet another modification of the shaker elements. In place of rails 56 and 56a, a set of vertically oriented cylinders 95 and 95a are mounted on the ends of each set of shaker support members 81 and 81a. Cylinders 95 and 95a are positioned above the ground so that they will engage the fruit-support structure and not the trunks of the vine as the cylinders are reciprocated during operation. Cylinders 95 and 95a are free to rotate about their vertical axes, and will thus roll along the fruit-support structure as the harvester moves down the row.

What is claimed is:

1. A method of harvesting grapes from grapevines wherein the trunks of said vines are planted in a row; wherein a horizontal trellis-supported fruiting wire extends along said row at a level above the upper ends of said trunks, wherein the fruit-bearing portions of said vines are secured to and extend along said fruiting wire, wherein the grapes grow from said fruit-bearing portions and are in a fruiting zone which is along and close to said fruiting wire, and wherein said vines include a plurality of non-fruiting laterals which extend generally upwardly and then outwardly and have down-hanging portions along said row to form a canopy over said fruiting zone, the method comprising:
   (a) positioning a pair of shaker elements within said canopy and at a level above the upper ends of said trunks and on opposite sides of a fruit bearing portion of one of said vines,
   (b) moving said shaker elements along the length of the row while maintaining said shaker elements within said canopy and at a level above the upper ends of said trunks and on opposite sides of the fruit bearing portions of said vines,
   (c) moving said shaker elements back and forth transversely of said row to shake said fruit bearing portions of said vines as said shaker elements are moved along said row.

2. The method as set forth in claim 1 and further including:
   (d) holding said shaker elements by support members which are transverse to said row and which extend from said shaker elements to outside of said canopy,
   (e) engaging and lifting up the down-hanging portions of the laterals of said canopy as said shaker elements are moved along the length of said row.
   (f) guiding the lifted up portions of said laterals freely over said shaker element support members as said shaker elements are moved along the length of said row.

3. The method as set forth in claim 1 and further including:
   (d) holding said shaker elements by support members which are transverse to said row and which extend downwardly from said shaker elements and then outwardly to outside of said canopy,
   (e) engaging and lifting up the down-hanging portions of the laterals of said canopy as said shaker elements are moved along the length of said row,
   (f) guiding the lifted up portions of said laterals freely over said shaker elements support members as said shaker elements are moved along the length of said row.

4. The method as set forth in claim 1 wherein step (b) includes positioning portions of said shaker elements at sequentially spaced apart points along the length of said fruit bearing portions of said vines and maintaining the portion of said shaker elements at each of said points when positioned thereat while positioning other portions of said shaker elements at the next point therealong.

5. A method of harvesting grapes from grapevines wherein the trunks of said vines are planted in a row, wherein a horizontal trellis-supported fruiting wire extends along said row at a level above the upper ends of said trunks, wherein the fruit-bearing portions of said vines are secured to and extend along said fruiting wire, wherein the grapes grow from said fruit-bearing portions and are in a fruiting zone which is along and close to said fruiting wire, wherein said fruiting wire and the fruit-bearing portions of said vines secured thereto comprise a fruit-support structure, and wherein said vines include a plurality of non-fruiting laterals which extend generally upwardly and outwardly and have down-hanging portions along said row to form a canopy over said fruiting zone, the method comprising:
   (a) extending a pair of shaker element support members, one on each side of said row, from outside of said canopy into close adjacency to said fruit-support structure.
   (b) positioning a pair of shaker elements, one on each of said shaker element support members, at a level above the upper ends of said trunks and on opposite sides of said fruit-support structure,
   (c) translating said shaker element support members along the length of said row,
   (d) maintaining said shaker elements within said canopy and at a level above the upper ends of said trunks and with said fruit-support structure between said shaker elements during translation of said shaker element support members along the length of said row,
   (e) moving said shaker elements in unison back and forth transversely of said row during translation of said shaker element support members along the length of said row.

6. The method as set forth in claim 5 and further including engaging and lifting the down-hanging portions of the laterals of said canopy and guiding said lifted portions freely over said shaker element support members as said shaker element support members are translated along the length of said row.

7. The method as set forth in claim 5 wherein step (a) includes extending said shaker element support members upwardly on the inside of said canopy towards said fruit-support structure.

8. The method as set forth in claim 5 wherein step (d) includes positioning portions of said shaker elements sequentially at spaced apart points along the length of said fruit-support structure and maintaining said portions of said shaker elements at each of said points when positioned thereat while positioning said other portions of said shaker elements at the next point therealong.

9. The method as set forth in claim 8 and further including engaging and lifting the down-hanging portions of the laterals of said canopy and guiding said lifted portions freely over said shaker element support members as said shaker element support members are translated along the length of said row.

10. The method as set forth in claim 5 wherein step (e) includes moving said shaker elements with a relatively high speed transverse to said row when said shaker elements are at the centerline of said row and moving said shaker elements with a relatively low speed transverse to said row when the direction of transverse movement of said shaker elements reverses.

* * * * *